Patented Apr. 22, 1924.

1,491,224

UNITED STATES PATENT OFFICE.

HUGH S. COOPER, OF CLEVELAND, OHIO, ASSIGNOR TO KEMET LABORATORIES COMPANY, INC., A CORPORATION OF OHIO.

REFRACTORY ARTICLE AND PROCESS OF MAKING THE SAME.

No Drawing. Application filed October 26, 1922. Serial No. 597,174.

*To all whom it may concern:*

Be it known that I, HUGH S. COOPER, a citizen of the United States, residing at Cleveland, in the county of Cuyahoga and State of Ohio, have invented certain new and useful Improvements in Refractory Articles and Processes of Making the Same, of which the following is a specification.

This invention relates to the manufacture of refractory articles consisting essentially of a highly refractory oxid, especially zirconium oxid. The invention, in its broadest aspect, is based upon my discovery that certain substances normally associated with zirconium oxid in its native state (zirconia) exert a bonding action sufficient to insure a firmly coherent product. Crucibles, combustion tubes, or other articles, prepared as described herein, may be subjected to temperatures much in excess of 2000° C. for extended periods without distortion, shrinkage, or other deterioration.

Zirconium oxid has long been used where an extremely infusible material, substantially non-volatile at the highest temperatures, is required. Heretofore, however, in the manufacture of refractory articles from zirconium oxid, it has been considered necessary to use bonding agents to secure the coherence of the oxid during the period of formation and use. Starch, phosphoric acid, magnesia, and clay may be mentioned as examples of the materials used to bond the zirconium oxid. The presence of such materials is objectionable because of the shrinkage and distortion which they may produce when the articles formed from the bonded oxid are subjected to high temperatures. I have found that no extraneous bonding material is needed when zirconia containing small amounts of relatively fusible impurities, especially ferric oxid, is used, and that a coherent product free from the defects above referred to is produced.

Iron oxid in amounts of from 0.25% to 5% gives an adequate bonding effect when the refractory article is formed as hereinafter described. The presence of silica or titanium oxid, while not essential to the proper bonding of the zirconia, is sometimes advantageous. The following is an analysis of a zirconium ore which has been successfully used for the manufacture of refractory articles, without association with a separate bonding agent:

| | |
|---|---|
| $ZrO_2$ | 95.24 |
| $TiO_2$ | .76 |
| $Fe_2O_3$ | 1.04 |
| $SiO_2$ | 1.08 |
| | 98.12 |

In accordance with the present invention, zirconia containing a suitable amount of fusible oxid impurities, for example the ore above described, is first converted into stable, crystalline form by electrical fusion. This preliminary treatment is desirable to minimize shrinkage of the articles formed from the oxid when subjected to high temperature.

The fused product is then ground to about 80 to 100 mesh. The subdivision may of course be varied, but if the zirconia is too coarsely ground the oxid impurities will not exert a proper bonding action. On the other hand, very finely powdered zirconia is too voluminous to produce articles of the requisite weight and strength.

The ground zirconia is mixed with water, water containing glycerine, or other liquid adapted to yield a plastic mass suitable for pressing into a mold. The mass is preferably compacted into the mold under heavy pressure, for example 35 to 50 tons per square inch, to insure the requisite density and freedom from objectionable porosity. The mold may be of any desired kind having means for permitting the removal of the formed article without breakage.

After removal from the mold, the article is dried at room temperature for several hours, then heated to about 100° C. for a few days. The article is next transferred to a suitable furnace and gradually raised to a temperature of 1000° C., after which it is fired at about 1500° C. The heating at 1000° C. should be continued for about 24 hours, and the final firing for about one hour.

The process as described above produces articles having adequate coherence and strength, as the fritting of the oxid impurities affords a firm bond, reinforcing the relatively low cohesion of the zirconium oxid particles. When present in the amounts indicated, the oxid impurities do not substantially lower the fusing point of the articles nor otherwise detrimentally affect them.

For economy of operation it is preferable to use a zirconium oxid ore containing in its native state the requisite amount of iron oxide or other component adapted to serve as a bonding agent. However, the raw material may be treated in any suitable manner either to increase or decrease its content of bonding material.

Thorium oxid has refractory properties similar to those of zirconium oxid and is likewise capable of being bonded by small amounts of fusible substances. Mixtures of zirconium oxid and thorium oxid in any proportions may be used.

I am aware that the patent to Arnold, 1,121,889, dated Dec. 22, 1914, describes the molding of pure oxids of zirconium and thorium associated only with water. It is alleged that coherent articles are produced by burning the molded bodies at 1600-1800° C. The present invention is distinguished from the process described in the Arnold patent by the use of zirconium oxid or thorium oxid, not in pure state, but containing certain additional substances of the character described, adapted to provide an adequate bond. A particular advantage of the present invention over prior processes arises from the elimination in many cases of the step of purifying the crude refractory oxid, and the production of a better product by virtue of the retained impurities.

I claim:—

1. Process of making refractory articles from zirconium oxid and thorium oxid associated with relatively fusible, non-volatile substances in amount sufficient to bond the articles without substantially impairing their refractory properties, comprising molding the oxids into the desired shape, and burning at a temperature sufficient to cause the fusible substances to bond the oxids.

2. Process of making refractory articles from zirconium oxid containing from 0.25% to 5% of a relatively fusible, non-volatile substance adapted to bond the oxid, comprising molding the oxid into the desired shape, and burning at a temperature sufficient to cause the fusible substance to bond the oxid.

3. Process according to claim 2, in which the zirconium oxid is fused and ground before molding.

4. Process according to claim 3, in which the zirconium oxid is ground to a fineness of 80 to 100 mesh.

5. Process according to claim 2, in which the zirconium oxid is compacted while in the mold by a pressure of from 35 to 50 tons per square inch.

6. Process of making refractory articles from zirconium oxid containing from 0.25% to 5% of relatively fusible, non-volatile impurities, comprising fusing the oxid, grinding the fused product to a fineness of about 100 mesh, mixing the ground material with a liquid to a plastic consistency, compacting the plastic mass into a mold under heavy pressure, removing the formed article from the mold, drying the article, subjecting the same to gradually increasing temperature to about 1000° C., and finally firing at about 1500° C., whereby the impurities are caused to exert a bonding action upon the oxid.

7. Process of making refractory articles from zirconium oxid containing from 0.25% to 5% of an oxid of iron, comprising molding the zirconium oxid into the desired shape, and burning at a temperature sufficient to cause the oxid of iron to exert a bonding action upon the zirconium oxid.

8. A refractory article consisting of zirconium oxid bonded by an oxid of iron in amount not more than 5% of the weight of the zirconium oxid.

9. A refractory article consisting of zirconia bonded by relatively fusible impurities therein, said impurities being present in amounts not substantially impairing the refractory properties of the article.

In testimony whereof, I affix my signature.

HUGH S. COOPER.